July 16, 1968 G. HELLBARDT ET AL 3,393,103
METHOD OF POLISHING GALLIUM ARSENIDE SINGLE CRYSTALS BY REACTION WITH A GASEOUS ATMOSPHERE INCOMPLETELY SATURATED WITH GALLIUM
Filed July 12, 1965
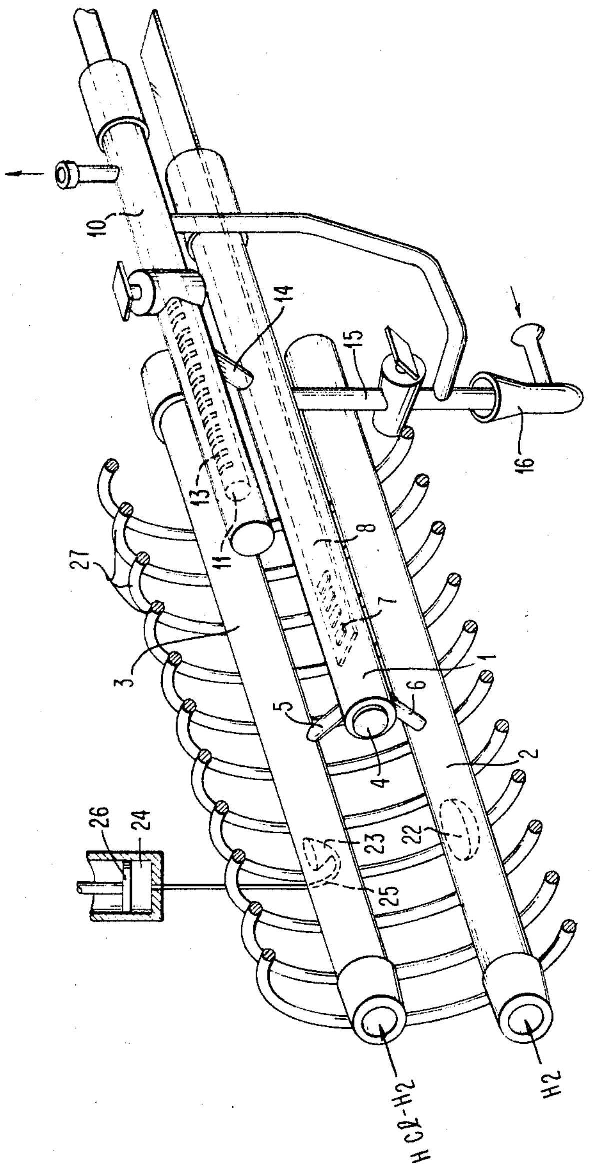
INVENTORS
GÜNTER HELLBARDT
MICHAEL MICHELITSCH
BY Thomas J. Kilgannon Jr.
ATTORNEY 3,393,103

METHOD OF POLISHING GALLIUM ARSENIDE SINGLE CRYSTALS BY REACTION WITH A GASEOUS ATMOSPHERE INCOMPLETELY SATURATED WITH GALLIUM

Günter Hellbardt, Boblingen, and Michael Michelitsch, Stuttgart-Vaihingen, Germany, assignors to International Business Machines Corporation, Armonk, N.Y., a corporation of New York Filed July 12, 1965, Ser. No. 471,260
Claims priority, application Germany, July 15, 1964, J 26,209
7 Claims. (Cl. 148—175)

This invention relates to a method of effecting chemical fine polishing of single crystals. More specifically it relates to a method of effecting chemical fine polishing of GaAs single-crystal wafers in the production of semiconductor components.

When fabricating semiconductor components, it is necessary that the surfaces of the semiconductor single-crystal wafers used as the starting elements be polished to a very high degree of fineness preparatory to doping or coating. Polishing is effected partly by mechanical, partly by chemical means in several successive polishing steps producing an increasing degree of fineness. In addition to the geometric nature of the surfaces being polished, their chemical nature is of decisive importance for the subsequent steps in producing semiconductor components. The chemical nature relates to the degree of contamination present. The absolute absence of all contamination is most desirable and to this end the surfaces being polished must be cleansed, rinsed and dried very carefully between the individual polishing steps and especially after the last polishing step.

In such operations, it is frequently difficult or even impossible to avoid oxidation or other contamination of the polished surfaces. The expedients used for avoiding oxidation or other contamination are liable to complicate the fabrication process or cause a deterioration in the quality of the semiconductor components. Thus, one polishing step has in many cases been performed by etching in an HI, HBr or HCl stream. Although the technique has been successful in avoiding a contamination of the polished surfaces to a great extent, the degree of fineness of the treated surfaces obtained thereby has not been good enough for many applications.

It is, therefore, an object of this invention to provide a method of chemically fine polishing gallium arsenide semiconductor material which is superior to prior art methods.

Another object is to provide a method of polishing gallium arsenide which avoids the necessity for subsequent mechanical polishing and is free from oxygen and other contaminants.

Another object is to provide a method of polishing gallium arsenide which by varying conditions in the various steps thereof permits epitaxial deposition.

Still another object is to provide a method of polishing gallium arsenide chemically which produces smoother and more planar semiconductors than prior art methods.

Still another object is to provide a method of chemically polishing gallium arsenide which results in gallium arsenide wafers having a high degree of fineness, i.e. an extremely small roughness depth and waviness, which preferably can be carried out in an arrangement designed for performing subsequent fabrication steps, so that it is possible not only to reduce the necessary equipment and required time but also to avoid oxidation.

A feature of this invention is the utilization in the method of polishing GaAs single crystals of the step of undersaturating a mixture of gallium, arsenic, hydrogen and a hydrogen halide with gallium in the presence of GaAs wafers over a temperature range sufficient to cause polishing of said wafers.

Another feature of this invention is the utilization of a method wherein the step of undersaturating a mixture of gallium, arsenic, hydrogen and hydrogen halide includes the step of reacting gaseous hydrogen and a hydrogen halide having given flow rates with liquid gallium of a predetermined surface area to produce a vapor of hydrogen, a hydrogen halide and gallium. Also included is the step of vaporizing arsenic in the presence of hydrogen flowing over the arsenic at a given flow rate to produce a vapor of hydrogen and arsenic. Finally, the step of mixing the vapors to produce a mixture of hydrogen, hydrogen halide, gallium and arsenic undersaturated with gallium is utilized.

Another feature is the utilization of the step of undersaturating a gaseous mixture of gallium, arsenic, hydrogen and a hydrogen halide with gallium in the presence of GaAs wafers in a temperature range of 750°–850° C. to cause chemical fine polishing of the wafers.

Still another feature is the utilization of a method wherein the step of undersaturating the gaseous mixture includes the steps of reacting gaseous hydrogen and hydrogen chloride flowing at rates of 25 $cm.^3$/min. and 70 $cm.^3$/min. respectively with liquid gallium having a range of surface areas greater than 3 $cm.^2$ but less than 6 $cm.^2$ in a temperature range of 690°–710° C. to produce a vapor of hydrogen, hydrogen chloride and gallium. Also included are the steps of vaporizing arsenic in the presence of hydrogen flowing over arsenic at a rate of 70 $cm.^3$/min. in a temperature range of 440°–460° C. to produce a vapor of hydrogen and arsenic and, mixing the wafers to produce a mixture of hydrogen, hydrogen chloride, gallium and arsenic undersaturated with gallium.

Still another feature is the utilization of a method of polishing GaAs single crystals which includes the steps of introducing suitably prepared wafers of single crystal GaAs into polishing apparatus; reacting gaseous hydrogen and a hydrogen halide at predetermined flow rates with liquid gallium which has a predetermined range of surface areas over a temperature range sufficient to produce a vapor of hydrogen and a hydrogen halide undersaturated with gallium; flowing gaseous hydrogen at a given flow rate over arsenic over a temperature range sufficient to produce a vapor of arsenic and hydrogen; mixing the vapor undersaturated with gallium with the vapor of arsenic and hydrogen and reacting the mixed vapors with GaAs crystals over a predetermined range of temperature to cause fine polishing of a surface of the GaAs wafers.

Yet another feature is the further step of increasing the predetermined surface area of the liquid gallium to a surface area greater than the predetermined surfaces area so that epitaxial deposition of gallium arsenide occurs due to oversaturation of the hydrogen, hydrogen halide vapor with gallium.

The foregoing and other objects, features and advantages of the invention will be apparent from the following more particular description of a preferred embodiment of the invention as illustrated in the accompanying drawing wherein:

The sole figure is an elevation view of polishing-deposition apparatus utilized in carrying out the method of the present invention.

The present invention provides a method of effecting chemical fine polishing, preferably chemical fine polishing of GaAs single-crystal wafers in the fabrication of semiconductor components, which is characterized in that the composition of the etchant is preferably, by the controllable addition of suitable substances, approximated to the composition of the compound or mixture by saturating the etchant with one or more of the components of the body to be polished or with compounds containing such components.

In this connection, it has proved to be of particular advantage if the polishing process is carried out in an apparatus suited for effecting crystal growth, preferably in an apparatus suited for effecting epitaxial growth by gas transport, and if it precedes and/or follows a coating and/or doping process.

An especially advantageous embodiment of the method according to this invention is characterized in that the transition from the fine polishing step to the epitaxial growing step or doping step or vice versa is respectively effected by changing the concentration of the substances contained in the etching or transport gas, by adding substances promoting or retarding the precipitation of said substances, by changing the temperature, the pressure, etc., or by a predetermined combination of such measures.

In accordance with a further, particularly advantageous embodiment of the invention for effecting chemical fine polishing of GaAs, a gas mixture consisting of HCl flowing at 25 $cm.^3/min.$ and $H_2$ flowing at 70 $cm.^3/min.$ is directed across a gallium area of 4 $cm.^2$ heated to $700\pm10°$ C. and $H_2$ flowing at 70 $cm.^3/min.$ is directed across an arsenic area heated to $450\pm10°$ C., the two streams being thereafter mixed and subsequently directed across the GaAs wafer to be polished which has been heated to a temperature of 750°–850° C., preferably 800°–825° C.

Referring now to the figure there is shown an elevation view of the apparatus utilized in carrying out the method of the present invention. Mounted in the tube 1, which is connected via conduits 5 and 6 to tubes 2 and 3, is a slide 8 on which GaAs single-crystal wafers 7 are placed. The GaAs single-crystal wafers 7 are of the N conductivity type and are to be covered by epitaxial growth with a P-type layer of GaAs. First, however, it is necessary to reduce the surface roughness of the mechanically prepolished and carefully cleansed wafers by chemical polishing. For that purpose, vessels 22 and 23 are disposed internally of tubes 2 and 3. The vessel 23 is connected via a capillary tube 25 to a supply container 24 containing liquid gallium. The vessel 23 is formed so that, depending on the level of the liquid, the surface of the liquid substance accommodated therein covers an area of between 3 $cm.^2$ and 6 $cm.^2$. The vessel 22 contains pure arsenic which is maintained at a temperature of $450\pm10°$ C. The tube 2 is passed by $H_2$ which transports vaporous arsenic through the conduit 6 into the tube 1. Under the stated conditions, the partial vapor pressure of the arsenic is approximately 10 torr.

The vessel 23 contains liquid gallium which is maintained at a temperature of $700°\pm10°$ C. The level of the liquid in the vessel 23, which is connected via the conduit 25 to the supply container 24, is adjusted by displacing the piston 26 so that the surface of the liquid gallium covers an area of 4 $cm.^2$. Heating of the containers 22, 23 and 24 as well of the GaAs wafers 7 is effected by a furnace indicated by means of the coil 27. The tubes 1, 2 and 3 have a diameter of 18 mm., the over-all system having a length of 50 cm.

HCl is passed through the tube 3 at 25 $cm.^3/min.$ and $H_2$ at 70 $cm.^3/min.$ and transport gallium in the form of vapor through the conduit 5 into the tube 1. By means of the furnace indicated by the coil 27, the temperature of the GaAs single-crystal wafer 7 is maintained at approximately 800°–825° C. With the above indicated temperature and flow conditions prevailing, the $HCl-H_2$ mixture is undersaturated with gallium, which results in an abrasion of the N-doped GaAs single-crystal wafers 7 and thus in the surfaces of said wafers being polished. The less the undersaturation of the $HCl-H_2$ mixture with gallium, the slower is the abrasion of the wafers 7 and the smaller is the roughness depth and the better the smoothness of these single crystals, which incidentally are cut along a $(\bar{1}11)$ plane. The degree of saturation of the $HCl-H_2$ mixture depends on the size of the surface of the liquid gallium contained in the vessel 23, the size of that surface being adjustable by displacing the piston 26.

On completion of the chemical polishing step, which is readily observed through the window 4, the surface of the liquid gallium which is P doped, in the vessel 23 is increased to an area of 6 $cm.^2$ which results in an oversaturation of the $HCl-H_2$ mixture with P-doped gallium, so that an epitaxial P-doped GaAs layer is precipitated on the surfaces of the wafer 7.

It may also be desirable to provide a plurality of vessels and supply containers with differentially doped substances, so that it is possible to grow epitaxially a plurality of alternately N and P doped layers on the wafer 7. Also so-called heterojunctions may be produced in this manner.

In order to avoid the necessity of interrupting the process after each polishing and coating step, a tube 10 is provided which is connected via a conduit 14 to the tube 1. A support 11 which is mounted in the tube 10 in a manner to be longitudinally displaceable and rotatable has slots 13 which respectively receive a GaAs wafer. After the processing of the respective wafers 7 mounted on the support 8 has been completed, the support 8 is moved rearward sufficiently for the wafers 7 to drop through the channel 15 into the supply container 16 when the support is rotated. Then the support 11 is displaced longitudinally and rotated for feeding a corresponding number of GaAs wafers contained in the slots 13 through the channel 14 onto the support 8, whereafter the process is repeated. The inner diameter of the tube 10 is adapted to the dimensions of the wafers 7 so that only the respective wafer overlying the channel 14 can drop out of a slot 13.

In the course of the above described process, the following reactions take place:

$$\left.\begin{array}{l} Ga_{fl}+3HCl_g \rightleftarrows GaCl+3/2H_{2g} \\ 2Ga_{fl}+GaCl_{3g} \rightleftarrows 3GaCl_g \end{array}\right\} \text{Ga source}$$

$$\left.\begin{array}{l} GaAs_f+3HCl_g \rightleftarrows GaCl_{3g}+3/2H_{2g}+1/4As_{4g} \\ 2GaAs_f+GaCl_{3g} \rightleftarrows 3GaCl_g+1/2As_{4g} \\ (As_f \rightleftarrows As_{4g}) \end{array}\right\} \text{seed}$$

It should be appreciated that a distinction exists between etching and polishing. In the former instance, the action of one substance on another is preferential to the extent that certain areas having certain crystallographic axes or chemical composition are attacked, rather than areas having different orientations or chemical composition. Etching can generally be accomplished with relative ease under a wide set of conditions and in the semiconductor art is generally undesirable if it meets the criterion of preferential etching. In the latter instance, non-preferential etching is the criterion. Under such circumstances all areas of the treated semiconductor are acted upon in the same manner such that a smooth surface without pitting or deformation is obtained. Polishing to produce a smooth, uncontaminated surface is difficult to attain and conditions of temperature, pressure, flow rate, and the like may be varied only within narrow limits to obtain a polished surface such as is suitable for use in a subsequent epitaxial deposition step. Thus, the fact that one material may be characterized as being capable of etching another, such characterization does not indicate that polishing can be attained unless the special conditions required for polishing are fulfilled.

While the invention has been particularly shown and described with reference to a preferred embodiment, it will be understood by those skilled in the art that various changes in the form and details may be made therein without departing from the spirit and scope of the invention.

What is claimed is:

1. In the method of polishing gallium arsenide single crystals the step of:

reacting a mixture of gallium, arsenic, hydrogen and hydrogen halide vapors incompletely saturated with gallium, with gallium arsenide wafers over a temperature range sufficient to cause polishing of said wafers.

2. A method of polishing gallium arsenide single crystals comprising the steps of:

introducing suitably prepared wafers of singe crystal gallium arsenide into polishing apparatus, reacting gaseous hydrogen and a hydrogen halide at predetermined flow rates with liquid gallium having a predetermined range of surface areas over a temperature range sufficient to produce a vapor of said hydrogen and said hydrogen halide incompletely saturated with gallium, flowing gaseous hydrogen at a given flow rate over arsenic over a temperature range sufficient to produce a vapor of said arsenic and said hydrogen, mixing said vapor incompletely saturated with gallium and said vapor of arsenic and hydrogen, reacting said mixed vapors with said gallium arsenide crystals over a predetermined range of temperatures to cause fine polishing of a surface of said gallium arsenide wafers.

3. A method of polishing gallium arsenide single crystals as in claim 2 further including the step of increasing the predetermined surface area of said liquid gallium to a surface area greater than said predetermined range of surface areas so that epitaxial deposition of gallium arsenide occurs on said crystals due to supersaturation of said hydrogen and said hydrogen halide vapor with gallium.

4. A method of polishing gallium arsenide single crystals comprising the steps of:

introducing suitably prepared wafers of single crystal gallium arsenide into polishing apparatus, reacting gaseous hydrogen and hydrogen chloride flowing at rates of 70 cm.$^3$/min. and 25 cm.$^3$/min. respectively with liquid gallium having a range of surface areas of greater than 3 cm.$^2$ but less than 6 cm.$^2$ over a temperature range of 690°–710° C. to produce a vapor of said hydrogen and hydrogen chloride incompletely saturated with gallium, flowing gaseous hydrogen at a rate of 70 cm.$^3$/min. over arsenic in a temperature range of 440°–460° C. to produce a vapor of said arsenic and said hydrogen, mixing said vapor incompletely saturated with gallium and said vapor of arsenic and hydrogen, reacting said mixed vapors with said gallium arsenide crystals over a temperature range of 750°–850° C. to cause fine polishing of a surface of said gallium arsenide wafers.

5. A method of polishing gallium arsenide single crystals as in claim 4 further including the step of increasing the surface area of said liquid gallium to a surface area of 6 cm.$^2$ so that epitaxial deposition of gallium arsenide occurs on said crystals due to supersaturation of said hydrogen and hydrogen chloride vapor with gallium.

6. A method of polishing gallium arsenide single crystals comprising the steps of:

introducing suitably prepared wafers of single crystal gallium arsenide into polishing apparatus, reacting gaseous hydrogen and hydrogen chloride flowing at rates of 70 cm.$^3$/min. and 25 cm.$^3$/min. respectively with liquid gallium having a surface area of 4 cm.$^2$ at a temperature of 700° C. to produce a vapor of said hydrogen and hydrogen chloride incompletely saturated with gallium, flowing gaseous hydrogen at a rate of 70 cm.$^3$/min. over arsenic at a temperature of 450° C. to produce a vapor of said arsenic and said hydrogen, mixing said vapor incompletely saturated with gallium and said vapor of arsenic and hydrogen, reacting said mixed vapors with said gallium arsenide crystals over a temperature range of 800°–825° C. to cause fine polishing of a surface of said gallium arsenide wafers.

7. A method of polishing gallium arsenide single crystals as in claim 6 further including the steps of increasing the surface area of said liquid gallium to a surface area of 6 cm.$^2$ so that epitaxial deposition of gallium arsenide occurs on said wafers due to supersaturation of said hydrogen and hydrogen chloride with gallium.

References Cited

UNITED STATES PATENTS

| | | | |
|---|---|---|---|
| 3,173,802 | 3/1965 | Patez et al. | 148—175 XR |
| 3,218,205 | 11/1965 | Ruehrwein | 148—174 XR |
| 3,224,911 | 12/1965 | Williams et al. | 148—175 |
| 3,243,323 | 3/1966 | Corrigan et al. | 156—17XR |
| 3,312,570 | 4/1967 | Ruehrwein | 148—175 |
| 3,310,425 | 3/1967 | Goldsmith | 117—106 |
| 3,345,222 | 10/1967 | Nomura et al. | 148—175 |

HYLAND BIZOT, *Primary Examiner.*

P. WEINSTEIN, *Assistant Examiner.*

UNITED STATES PATENT OFFICE
CERTIFICATE OF CORRECTION

Patent No. 3,393,103 July 16, 1968

Gunter Hellbardt et al.

It is certified that error appears in the above identified patent and that said Letters Patent are hereby corrected as shown below:

Column 6, after line 33, insert -- 8. The method of claim 7 wherein said wafers of single crystal gallium arsenide are N-doped and said liquid gallium is P-doped whereby the resulting epitaxial layer is P-doped gallium arsenide. --. In the heading to the printed specification, line 13, "7 Claims." should read -- 8. Claims --.

Signed and sealed this 27th day of January 1970.

(SEAL)
Attest:

Edward M. Fletcher, Jr.
Attesting Officer

WILLIAM E. SCHUYLER, JR.
Commissioner of Patents